(12) United States Patent
Oh

(10) Patent No.: US 6,415,064 B1
(45) Date of Patent: Jul. 2, 2002

(54) SKEW CORRECTION APPARATUS AND METHOD

(75) Inventor: Hyang-Su Oh, Kyonggido (KR)

(73) Assignee: Samsung Electronics, Co., Ltd., Suwon (KR)

(*) Notice: Subject to any disclaimer, the term of this patent is extended or adjusted under 35 U.S.C. 154(b) by 0 days.

(21) Appl. No.: 09/320,287

(22) Filed: May 26, 1999

(30) Foreign Application Priority Data

May 26, 1998 (KR) .............................................. 98/19029

(51) Int. Cl.[7] .............................. G06K 9/32; G06K 9/00; H04N 1/04; H04N 1/40
(52) U.S. Cl. ........................ 382/289; 382/293; 382/291; 382/151; 358/496; 358/448
(58) Field of Search ................................. 382/289, 290, 382/291, 293, 295, 296, 282, 275, 294, 287, 151, 181, 194; 356/138, 139.05; 702/150; 358/488, 496, 448, 449

(56) References Cited

U.S. PATENT DOCUMENTS

| | | | | |
|---|---|---|---|---|
| 4,533,959 A | * | 8/1985 | Sakurai ....................... 358/280 |
| 5,181,260 A | * | 1/1993 | Kurosu et al. .............. 382/289 |
| 5,245,676 A | * | 9/1993 | Spitz ........................... 382/235 |
| 5,506,918 A | * | 4/1996 | Ishitani ....................... 382/289 |
| 5,818,976 A | * | 10/1998 | Pasco et al. ................ 382/289 |
| 5,923,790 A | * | 7/1999 | Miwa et al. ................ 382/298 |
| 5,937,106 A | * | 8/1999 | Murayama .................. 382/296 |
| 5,940,544 A | * | 8/1999 | Nako .......................... 382/293 |

* cited by examiner

Primary Examiner—Leo Boudreau
Assistant Examiner—Yosef Kassa
(74) Attorney, Agent, or Firm—Robert E. Bushnell, Esq.

(57) ABSTRACT

A skew correction apparatus and method enhance transmission efficiency or recognition efficiency in facsimile transmissions or optical character recognition (OCR) by correcting the format of the copy which is input and read in a skewed manner. The skew is corrected in accordance with the following steps or functions: counting the number of pixels in a main-scanning direction until copy discriminating data are met, starting from two spots of the read data in a sub-scanning direction; sensing a skew direction of the copy using the counted number of pixels; reading skew correction data corresponding to a difference between the number of pixels of the two spots in the main-scanning direction; and correcting the skew by reading in the main-scanning direction the changed coordinates by line units with respect to all lines of the copy in the sub-scanning direction according to the skew correction data and skew direction. As a result, cost is curtailed by performing corrections on a skew angle using a low cost processor through a simplified skew correction procedure without a complicated operation for calculating a skew angle or rotating an image on a copy in accordance with the calculated skew angle.

20 Claims, 14 Drawing Sheets image           1 0 0 0 0 0 1 0 1 1 1 1 1 1 0 0 0 0 0 0 1 1 0 0 0
image data

FIG. 2

| Black pixel difference(x3) | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Pixel interval(n) | 100 | 50 | 33 | 25 | 20 | 16 | 14 | 12 | 11 | 10 | 9 | 8 | 7 | 7 | 6 | 6 | 5 | 5 | 5 | 5 |
| Number of repeats(m) | 0 | 0 | 3 | 0 | 0 | 2 | 4 | 2 | 9 | 0 | 11 | 3 | 1 | 7 | 2 | 4 | 1 | 2 | 4 | 0 |
| Black pixel difference(x3) | 21 | 22 | 23 | 24 | 25 | 26 | 27 | 28 | 29 | 30 | 31 | 32 | 33 | 34 | 35 | 36 | 37 | 38 | 39 | 40 |
| Pixel interval(n) | 4 | 4 | 4 | 4 | 4 | 3 | 3 | 3 | 3 | 3 | 3 | 3 | 3 | 2 | 2 | 2 | 2 | 2 | 2 | 2 |
| Number of repeats(m) | 1 | 2 | 3 | 6 | 0 | 1 | 1 | 2 | 2 | 3 | 4 | 8 | 33 | 1 | 1 | 1 | 1 | 2 | 2 | 2 |
| Black pixel difference(x3) | 41 | 42 | 43 | 44 | 45 | 46 | 47 | 48 | 49 | 50 | 51 | 52 | 53 | 54 | 55 | 56 | 57 | 58 | 59 | 60 |
| Pixel interval(n) | 2 | 2 | 2 | 2 | 2 | 2 | 2 | 2 | 2 | 2 | 1 | 1 | 1 | 1 | 1 | 1 | 1 | 1 | 1 | 1 |
| Number of repeats(m) | 4 | 2 | 3 | 4 | 5 | 6 | 8 | 12 | 25 | 0 | 1 | 1 | 1 | 1 | 1 | 1 | 1 | 1 | 1 | 1 |
| Black pixel difference(x3) | 61 | 62 | 63 | 64 | 65 | 66 | 67 | 68 | 69 | 70 | 71 | 72 | 73 | 74 | 75 | 76 | 77 | 78 | 79 | 80 |
| Pixel interval(n) | 1 | 1 | 1 | 1 | 1 | 1 | 1 | 1 | 1 | 1 | 1 | 1 | 1 | 1 | 1 | 1 | 1 | 1 | 1 | 1 |
| Number of repeats(m) | 2 | 2 | 2 | 2 | 2 | 2 | 2 | 2 | 2 | 2 | 2 | 3 | 3 | 3 | 3 | 3 | 3 | 4 | 4 | 4 |
| Black pixel difference(x3) | 81 | 82 | 83 | 84 | 85 | 86 | 87 | 88 | 89 | 90 | 91 | 92 | 93 | 94 | 95 | 96 | 97 | 98 | 99 | 100 |
| Pixel interval(n) | 1 | 1 | 1 | 1 | 1 | 1 | 1 | 1 | 1 | 1 | 1 | 1 | 1 | 1 | 1 | 1 | 1 | 1 | 1 | 1 |
| Number of repeats(m) | 4 | 5 | 5 | 5 | 6 | 6 | 7 | 7 | 8 | 9 | 10 | 12 | 13 | 16 | 19 | 24 | 32 | 49 | 99 | 0 |

FIG. 9

| Correction data coordinates | (80,0) | (80,1) | (80,2) | (80,3) | (79,4) | (79,5) | (79,6) | (79,7) |
|---|---|---|---|---|---|---|---|---|
| Process method | | Main scanning 4 pixels Sub scanning 1 line | | | | Main scanning 4 pixels Sub scanning 1 line | | |
| Correction data coordinates | (78,8) | (78,9) | (78,10) | (78,11) | (78,12) | (77,13) | (77,14) | (77,15) |
| Process method | | | Main scanning 5 pixels Sub scanning 1 line | | | Main scanning 4 pixels Sub scanning 1 line | | |
| Correction data coordinates | (77,16) | (76,17) | (76,18) | (76,19) | (76,20) | (75,21) | (75,22) | (75,23) |
| Process method | | Main scanning 4 pixels Sub scanning 1 line | | | | Main scanning 5 pixels Sub scanning 1 line | | |
| Correction data coordinates | (75,24) | (75,25) | (74,26) | (74,27) | (74,28) | (74,29) | ... | ... |
| Process method | | | Main scanning 4 pixels Sub scanning 1 line | | | | | |

FIG. 11

| Correction data coordinates | (80,0) | (80,1) | (80,2) | (80,3) | (81,4) | (81,5) | (81,6) | (81,7) |
|---|---|---|---|---|---|---|---|---|
| Process method | Main scanning 4 pixels Sub scanning 1 line | | | | Main scanning 4 pixels Sub scanning 1 line | | | |
| Correction data coordinates | (82,8) | (82,9) | (82,10) | (82,11) | (82,12) | (83,13) | (83,14) | (83,15) |
| Process method | Main scanning 5 pixels Sub scanning 1 line | | | | Main scanning 4 pixels Sub scanning 1 line | | | |
| Correction data coordinates | (83,16) | (84,17) | (84,18) | (84,19) | (84,20) | (85,21) | (85,22) | (85,23) |
| Process method | Main scanning 4 pixels Sub scanning 1 line | | | | Main scanning 5 pixels Sub scanning 1 line | | | |
| Correction data coordinates | (85,24) | (85,25) | (86,26) | (86,27) | (86,28) | (86,29) | . . . | . . . |
| Process method | | | Main scanning 4 pixels Sub scanning 1 line | | | | | |

FIG. 13

SKEW CORRECTION APPARATUS AND METHOD

CLAIM OF PRIORITY

This application makes reference to, incorporates the same herein, and claims all benefits accruing under 35 U.S.C. §119 from my application SKEW CORRECTION APPARATUS AND METHOD USING THE SAME filed with the Korean Industrial Property Office on May 26, 1998 and there duly assigned Serial No. 19029/1998.

BACKGROUND OF THE INVENTION

1. Technical Field

The present invention relates to a skew correction apparatus and method and, more particularly, to a skew correction apparatus and method which enhances transmission efficiency or recognition efficiency in facsimile transmissions or optical character recognition processes by correcting the format of the copy which is input and read in a skewed condition.

2. Related Art

Today, various types of image processors conduct data processing on specific data using image data read from a copy. As image processors, facsimiles transmit read image data to a remote user through a network, scanners read and store image data, and optical character readers (OCRs) read data and recognize characters in the data. In using such image processors, a copy which is read in skewed condition may cause many problems. This will be discussed hereinafter in the context of using facsimiles.

The transmission procedures of a common facsimile can be explained briefly, as follows. The scanner of the facsimile reads the paper inserted by user(s), converts any image data obtained from that reading to binary image data, and provides the resulting image data to a central processing unit of the facsimile. The central processing unit then temporarily stores the binary image data in memory. Then, the central processing unit performs coding and compression on the binary image data according to a coding method (for example, MH, MR, or MMR) which follows International Telegraph and Telephone Consultative Committee (CCITT) Groups 1–4. The compressed binary image data is known as a facsimile message. The central processing unit then transmits the facsimile message to the corresponding facsimile through a telephone line according to key inputs of the user(s).

In a conventional method for correcting the skewed copy, procedures for calculating a skew angle are complicated and take a considerable amount of time. In addition, additional memory and a high performance central processing unit are required to rotate the image of the copy based on the calculated angle, which increases the cost of adapting to a common facsimile device.

SUMMARY OF THE INVENTION

Accordingly, it is an object of the present invention to reduce cost by performing corrections of a skew angle using a low cost processor through a simplified skew correction procedure without complicated operation, that is, by calculating a skew angle or rotating an image on a copy in accordance with the calculated skew angle.

According to an aspect of the present invention, there is provided a skew correction apparatus in an image processor for reading data on a one-page copy and for performing image processing. The skew correction apparatus includes: a read data storing unit for storing data read from the one-page copy; a counter for counting the number of pixels in a main-scanning direction until copy discriminating data are met, starting from two spots of the data stored in the read data storing unit in a sub-scanning direction; a lookup table data storing unit for storing skew correction data corresponding to a difference between the number of pixels of the two spots in the main-scanning direction; and a processing unit for correcting skew by sensing a skew direction of the copy according to a selected rule using the difference between the number of pixels, and reading by line units the changed coordinates from the read data storing unit according to the skew correction data stored in the lookup table data storing unit.

Preferably, the lookup table data includes: a difference between the number of pixels of the two spots in the main-scanning direction; a pixel interval for determining the number of pixels to be read in the main-scanning direction from the data stored in the read data storing unit according to the difference between the number of pixels; a number of repetition times for determining the number of times of reading, in the main-scanning direction at the pixel intervals, the data stored in the read data storing unit corresponding to the coordinates changed one sub-scanning line before or after.

According to another aspect of the present invention, there is provided a skew correction method for correcting a one-page copy read and stored in skewed condition. The method includes the steps of: counting the number of pixels in a main-scanning direction until copy discriminating data are met, starting from two spots of the read data in a sub-scanning direction; sensing a skew direction of the copy using the counted number of pixels; reading skew correction data corresponding to the difference between the number of pixels of the two spots in the main-scanning direction; and correcting the skew by reading, in the main-scanning direction, the changed coordinates by line units with respect to all lines in the sub-scanning direction of the copy according to the skew correction data and skew direction.

Preferably, the step of sensing a skew direction senses the skew direction as "right" when the value obtained by subtracting the number of pixels at a second spot in the sub-scanning direction from those at a first spot in the sub-scanning direction is larger than "0". The step of sensing a skew direction senses the skew direction as "left" when the value obtained by subtracting the number of pixels at the second spot in the sub-scanning direction from those at the first spot in the sub-scanning direction is smaller than "0".

Preferably, the skew correction data include: a pixel interval for determining the number of pixels to be read in the main-scanning direction from the data stored in the read data storing unit according to the difference between the number of pixels of the two spots in the main-scanning direction; the number of repetition times for determining the number of repeated readings, in the main-scanning direction at pixel intervals of the data stored in the read data storing unit corresponding to the coordinates changed one sub-scanning line before or after.

Preferably, the step of correcting the skew corrects the skew by reading a pixel corresponding to the coordinates where the number of pixels in the main-scanning direction moved one sub-scanning line along the skew direction during repetition of said pixel interval if the number of times of repeat is "0", and by repeatedly reading said pixel interval according to the number of times of reading and reading the pixel corresponding to the coordinates where the number of pixels in main-scanning direction moved one sub-scanning line along the skew direction if the number of times of repeat is other than "0", and the number of times of repetition+1 reads the pixel corresponding to the coordinates where the number of pixels moved one sub-scanning line along the skew direction during running of the pixel interval+1.

Preferably, the coordinates are those of the position where lines in the sub-scanning direction are decreased by one if the skew direction is left, and are those of the position where lines in the sub-scanning direction are increased by one if the skew direction is right.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein:

FIG. 2 illustrates a relation between image and image data;

FIG. 9 illustrates a lookup table data for skew correction stored in the lookup table data storing unit of the present invention;

FIG. 11 illustrates a correction for the 80th sub-scanning line according to a correction method of the present invention, when the copy tilts to the left as shown in FIG. 10;

FIG. 13 illustrates a correction for the 80th sub-scanning line according to a correction method of the present invention, when the copy tilts to the right as shown in FIG. 12;

DETAILED DESCRIPTION OF THE INVENTION

The present invention now will be explained more fully hereinafter with reference to the accompanying drawings, in which preferred embodiments thereof are shown.

The terms and expressions which have been employed hereinafter are used as terms of description and not of limitation, and there is no intention in the use of such terms and expressions of excluding equivalents of the features shown and described, or portions thereof.

Figure 1:
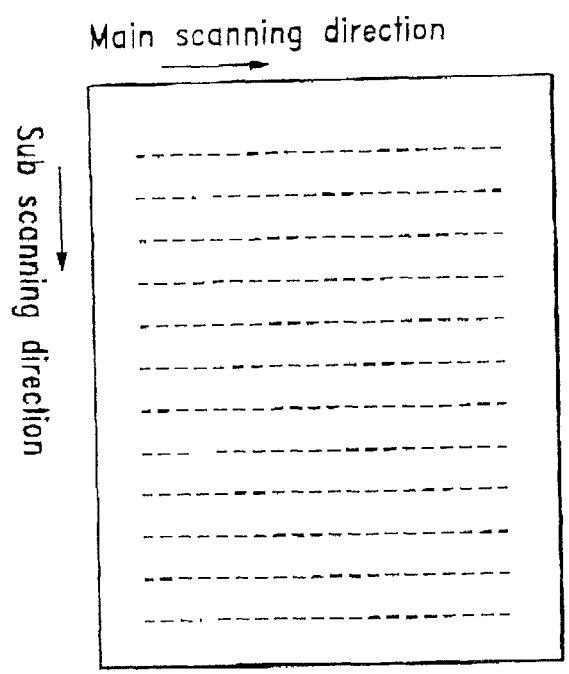
FIG. 1 illustrates the main-scanning direction and the sub-scanning direction upon reading a copy.

FIG. 1 illustrates the main-scanning direction and the sub-scanning direction upon reading a copy. In detail, when the copy shown in FIG. 1 is inserted into a facsimile, the facsimile moves the copy in the sub-scanning direction and the scanner reads a portion of the copy corresponding to a read line in the main-scanning direction. Using such a method, the copy is read to the end.

Figure 2:
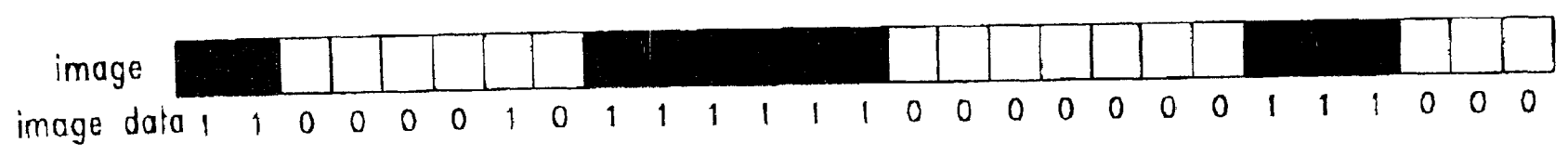

FIG. 2 illustrates an example of an image of one read line and the accompanying image data. As shown in FIG. 2, the black pixel of the image corresponds to data "1", while the white pixel of the image corresponds to data "0". In the example of FIG. 2, the image of one read line consists of 2 black pixels, 6 white pixels, 6 black pixels, 7 white pixels, 3 black pixels, and 3 white pixels. Accordingly, the image data is composed of "1100000011111 10000000111000".

The above-mentioned MH coding method will be explained hereinafter. The MH coding method follows a one-dimensional coding technique or run-length coding technique, in which coding data corresponding to a series of numbers of image data having an equivalent value are read. A terminate code table or a makeup code table is one in which coding data corresponds to image data having an equivalent value. Table 1 is such a terminate code table.

TABLE 1

| run | white pixel | black pixel |
|-----|-------------|-------------|
| 0 | 00110101 | 0000110111 |
| 1 | 00011111 | 010 |
| 2 | 0111 | 11 |
| 3 | 1000 | 10 |
| ... | ... | ... |

In Table 1, the "run" value is the number of image data. If the run value corresponding to the white pixel ("0", hereinafter) is 3, then the coding data will be 1000. If the run value corresponding to the black pixel ("1", hereinafter) is 3, then the coding data will be 10.

In general, a copy for transmission has lines of characters, and spaces between the lines. Image data which corresponds to the line portion of the copy have sequential ones and zeros. The central processing unit reads coding data corresponding to such sequential ones and zeros so as to perform image data coding. Therefore, as the number of sequential ones and zeros is smaller, the amount of the coding data increases.

In contrast, the image data corresponding to the space portion between lines have all ones. Since the image data corresponding to the spaces between lines are represented by a single set of coding data, the amount of coding data is remarkably decreased as compared with that of the original image data. That is, the compression rate for coding is extremely higher in the space portion than that in the line portion.

Figure 3:
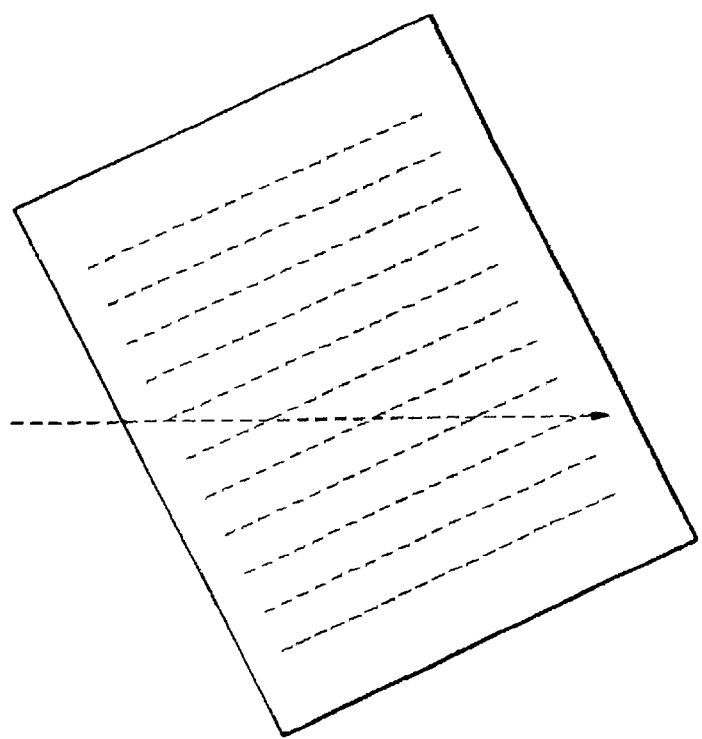
FIG. 3 illustrates an image consisting of image data obtained by reading the skewed copy.
Figure 4:
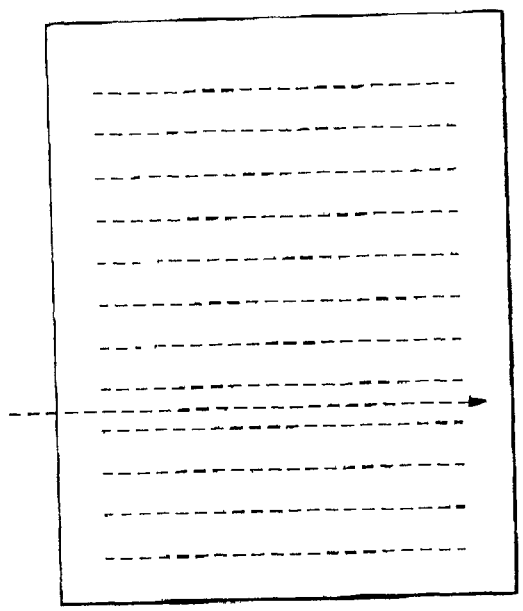
FIG. 4 illustrates an image which is newly structured by correcting the skew shown in FIG. 3.

However, as shown in FIG. 3, if the copy is transmitted in skewed form, a discrimination between the space portion and the read line is hard to be achieved. Thus, an unspecified large number of ones and zeros appear in the image data throughout the copy. As a result, a high compression rate may not be obtained, even when the binary image data are coded.

This causes an increase in the amount of facsimile messages, which makes the facsimile transmission time longer and the facsimile transmission charge more expensive.

A method for overcoming such a problem, caused by a skew of the copy, can be found in the Korea Patent Application No. 97-9308 entitled *A METHOD FOR SKEW COR-*

RECTION IN FACSIMILE TRANSMISSION filed by the same applicant as in this application.

A conventional method for skew correction in facsimile transmissions will be explained with reference to FIGS. 5 to 7.

Figure 5:
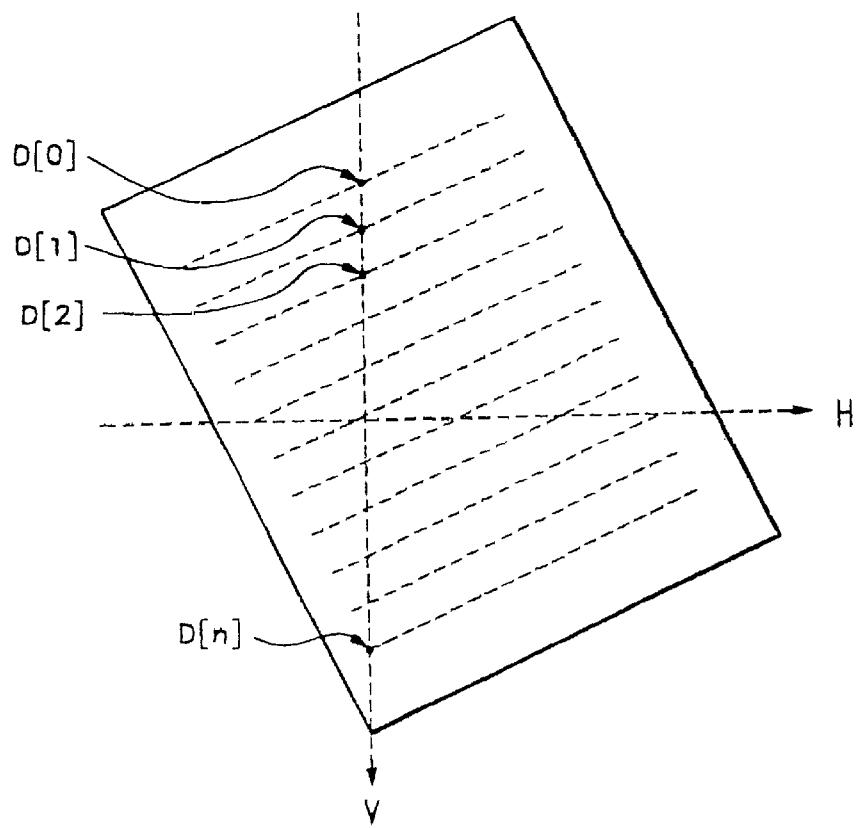
FIGS. 5 to 7 illustrate an example where lines are drawn onto an image of the read copy so as to calculate the skew angle.
Figure 6:
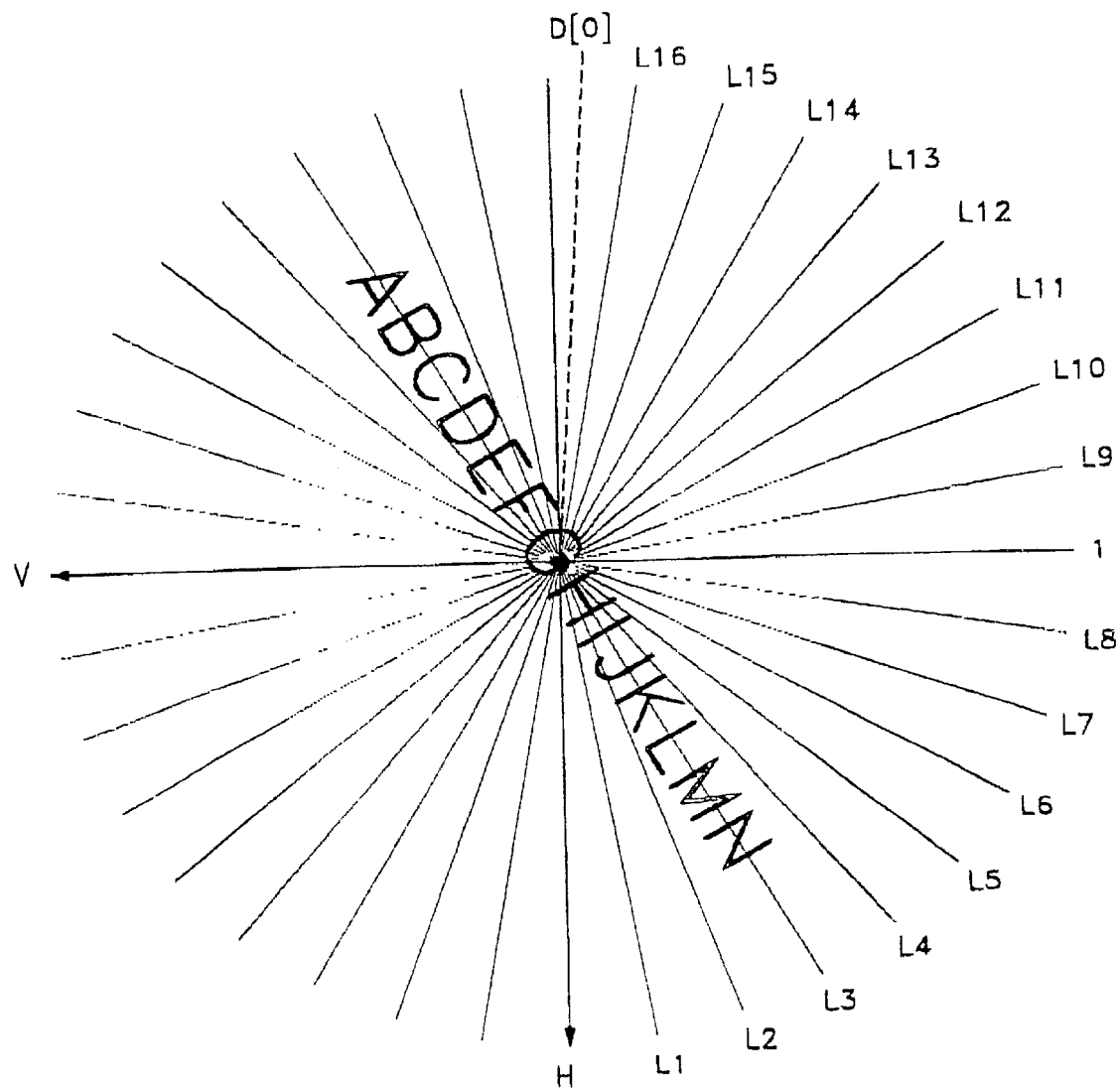

First, as shown in FIG. 5, a vertical line V is drawn in the sub-scanning direction on the image, and skew detection points D[0] to D[n] are produced where the vertical line V meets the black pixels of the image. Then, a horizontal line H is drawn in the main-scanning direction, passing through a skew detection point. As shown in FIG. 6, evenly spaced lines L1 to L16 are drawn from the horizontal line H by a selected angle ($\alpha°$), based on the skew detection point (here, D[0]). After that, the skew correction line which most frequently meets the black pixel (here, L3) is searched from among the lines L1 to L16.

Figure 7:
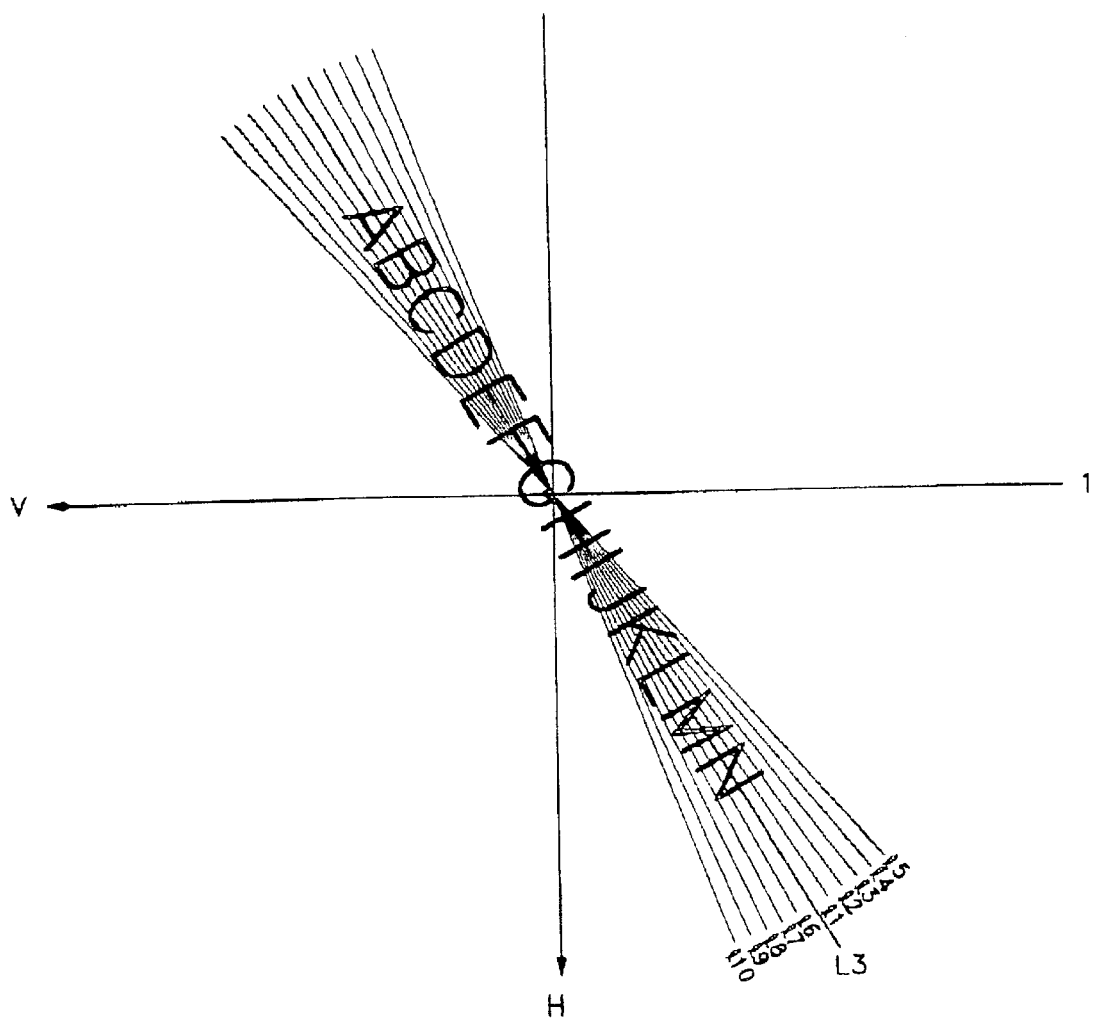

To obtain a more precise skew correction line, as shown in FIG. 7, lines l1 to l10 are drawn again from line L3 by another selected angle $\beta°$ within the range of $\pm °/2$. Then, the skew correction line which most frequently meets the black pixel is determined as a final skew correction line. Subsequently, the skew angle between the final skew correction line and the horizontal line is obtained.

The horizontal line drawn on a common copy consisting of character lines frequently meets the black pixels, while the horizontal line drawn on a copy consisting of drawings and characters may meet less black pixels. Therefore, it is required to calculate an average skew correction angle among the skew detection points D[0] to D[n]. Such an average skew correction angle will be a final skew correction angle.

After calculating the final skew correction angle, the image rotates by an angle corresponding to the final skew correction angle, thereby correcting the image skew.

Reference coordinate axes for an image of the copy change according to the image skew. The following matrix equation shows coordinate conversion or image rotation accompanied by a process of finding and reading the changed coordinates:

$$\begin{bmatrix} x' \\ y' \end{bmatrix} = \begin{bmatrix} \cos\theta & \sin\theta \\ -\sin\theta & \cos\theta \end{bmatrix} \begin{bmatrix} x \\ y \end{bmatrix}$$

wherein, $\theta$ denotes a skew angle, x and y denote arbitrary coordinates of the skewed copy, and x' and y' denote coordinates of the corrected copy.

The above describe operation may take a considerable time even when a high performance computer is employed.

Figure 8:
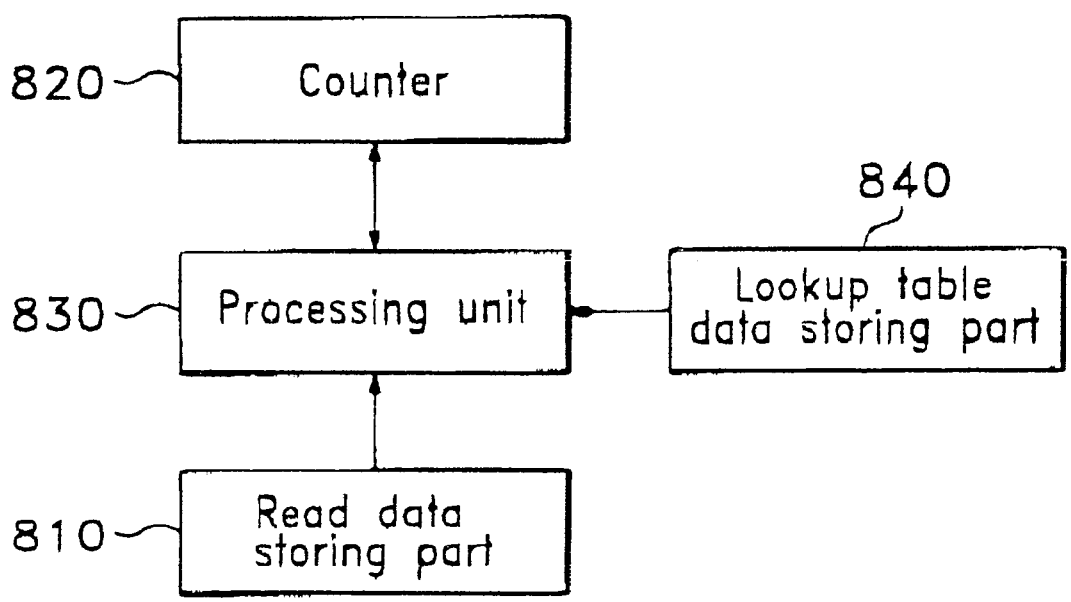
FIG. 8 illustrates a skew correction apparatus according to the present invention.

FIG. 8 illustrates a skew correction apparatus according to the present invention. Referring to FIG. 8, a sensor(not shown) senses that the copy has arrived at a reading unit (not shown). The reading unit reads one page of the copy and stores the read data into a read data storing unit 810. A counter 820 counts the number of pixels in the main-scanning direction until copy discriminating data are met, starting from two spots of the data stored in the read data storing unit 810 in the sub-scanning direction.

Preferably, the copy discriminating data are a first white pixel data of the two spots in the main-scanning direction. Therefore, counter 820 counts black pixels.

A lookup table data storing unit 840 stores skew correction data corresponding to a difference between the number of pixels of the two spots in the main-scanning direction, which is counted by the counter 820. A processing unit 830 corrects the skew by sensing a skew direction of the copy according to a selected rule using the difference between the number of pixels of the two spots in the main-scanning direction, and reading by line units the converted coordinates from the read data storing unit 810 according to the skew correction data stored in the lookup table data storing unit 840.

As shown in FIG. 9, the lookup table data storing unit 840 includes the following data: the difference between the number of pixels (i. e., difference between the number of black pixels, x3) of the two spots in the main-scanning direction; a pixel interval (n) for determining the number of pixels to be read in the main-scanning direction from the data stored according to the difference between the number of pixels; the number of repetition times (m) for determining the number of times of reading, in the main-scanning direction at the pixel intervals, the data stored corresponding to the coordinates changed one sub-scanning line before or after. Products have such data calculated and stored therein.

A skew correction apparatus and a method of the present invention will be explained in detail with reference to FIGS. 8 to 15.

Figure 14:
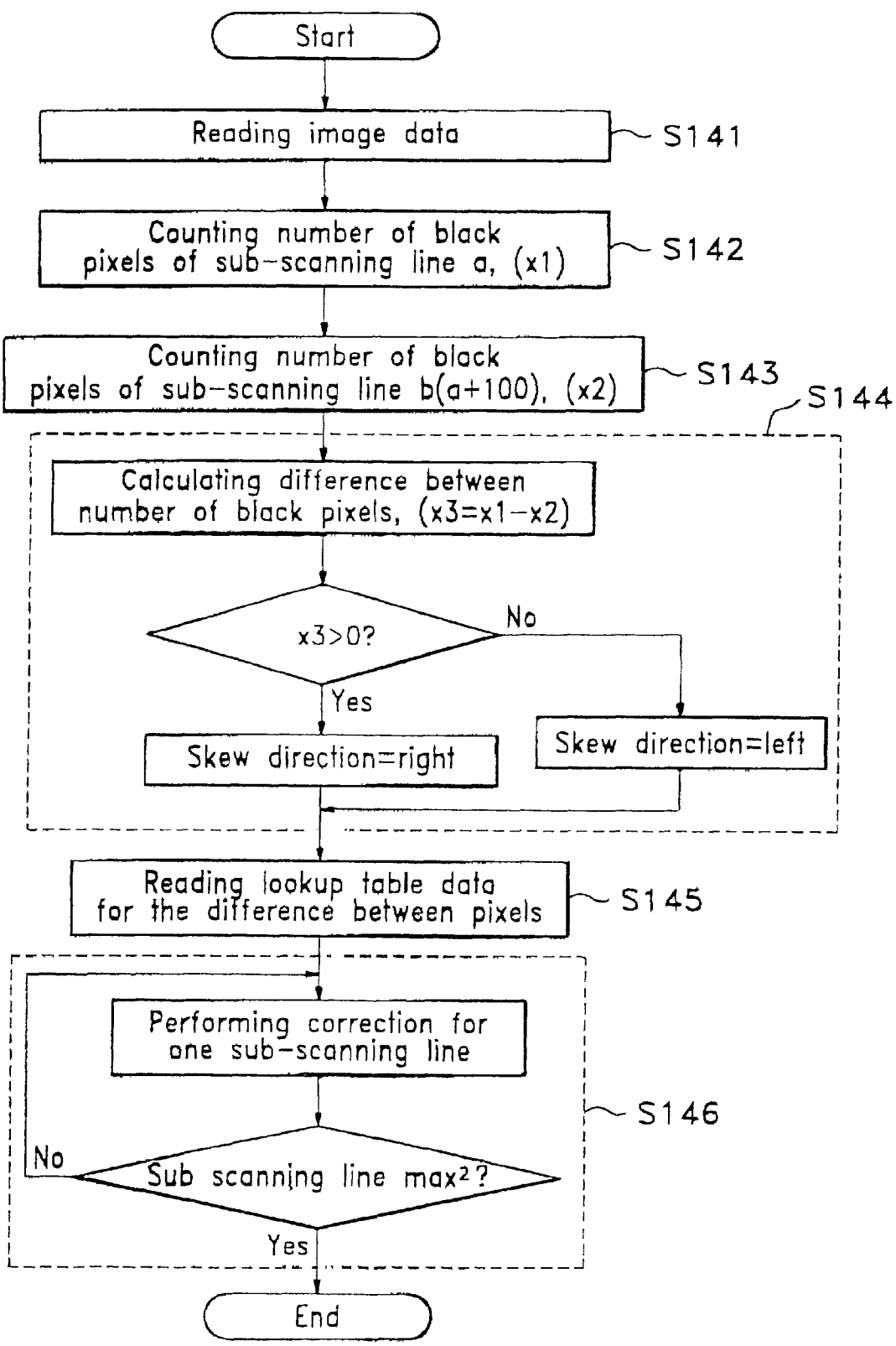
FIG. 14 i s a flow diagram of the skew correction method of the present invention.

First, a sensor (not shown) senses that the copy has arrived at a reading unit (not shown), which then reads one page of the copy and stores the read data into the read data storing unit 810 (step S141 of FIG. 14).

Common-sized paper always has spaces, and when the copy is entered in a skewed fashion, the input image data are detected as black in the main-scanning direction until such spaces are met.

Figure 10:
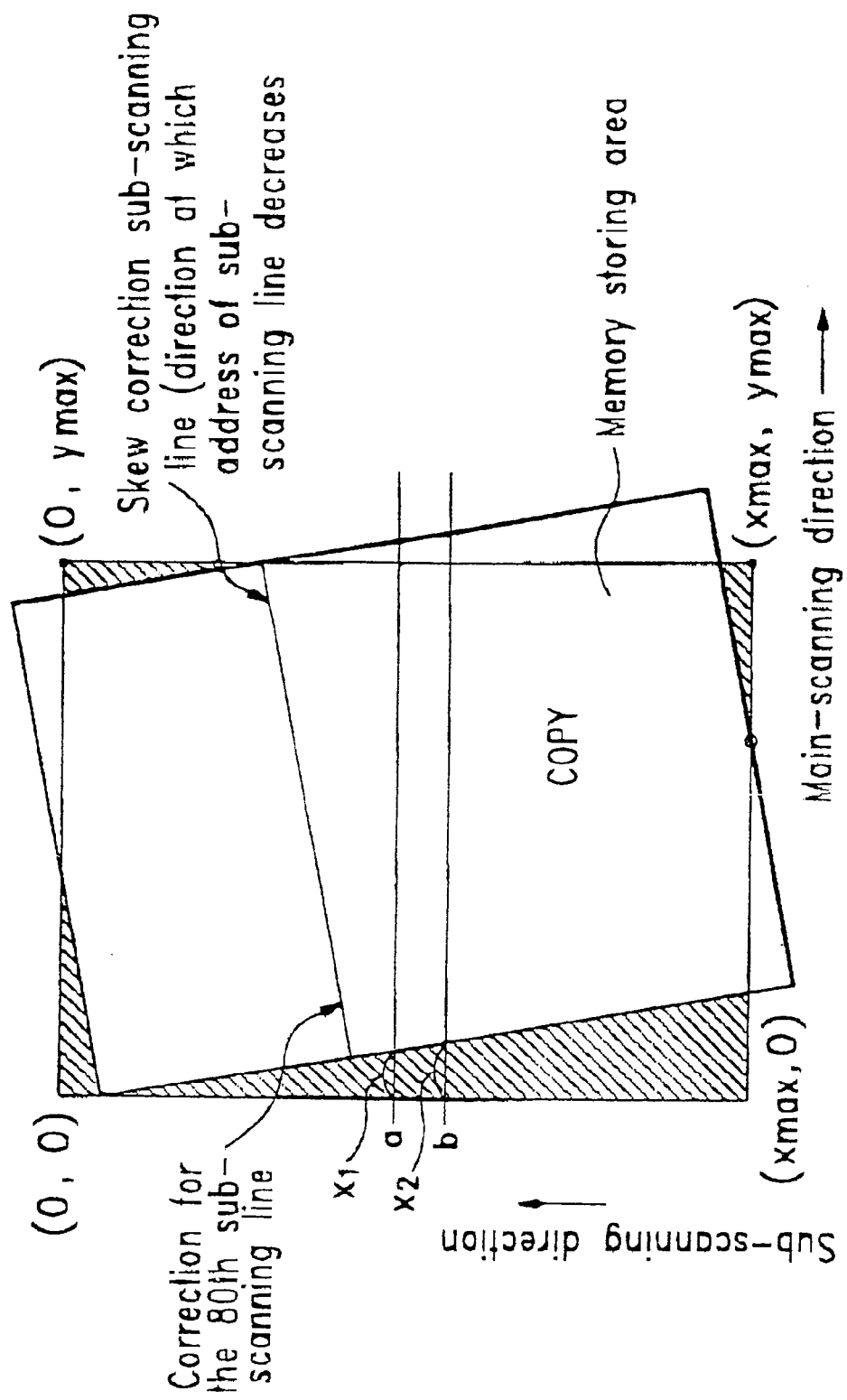
FIG. 10 illustrates a copy tilting to the left.
Figure 12:
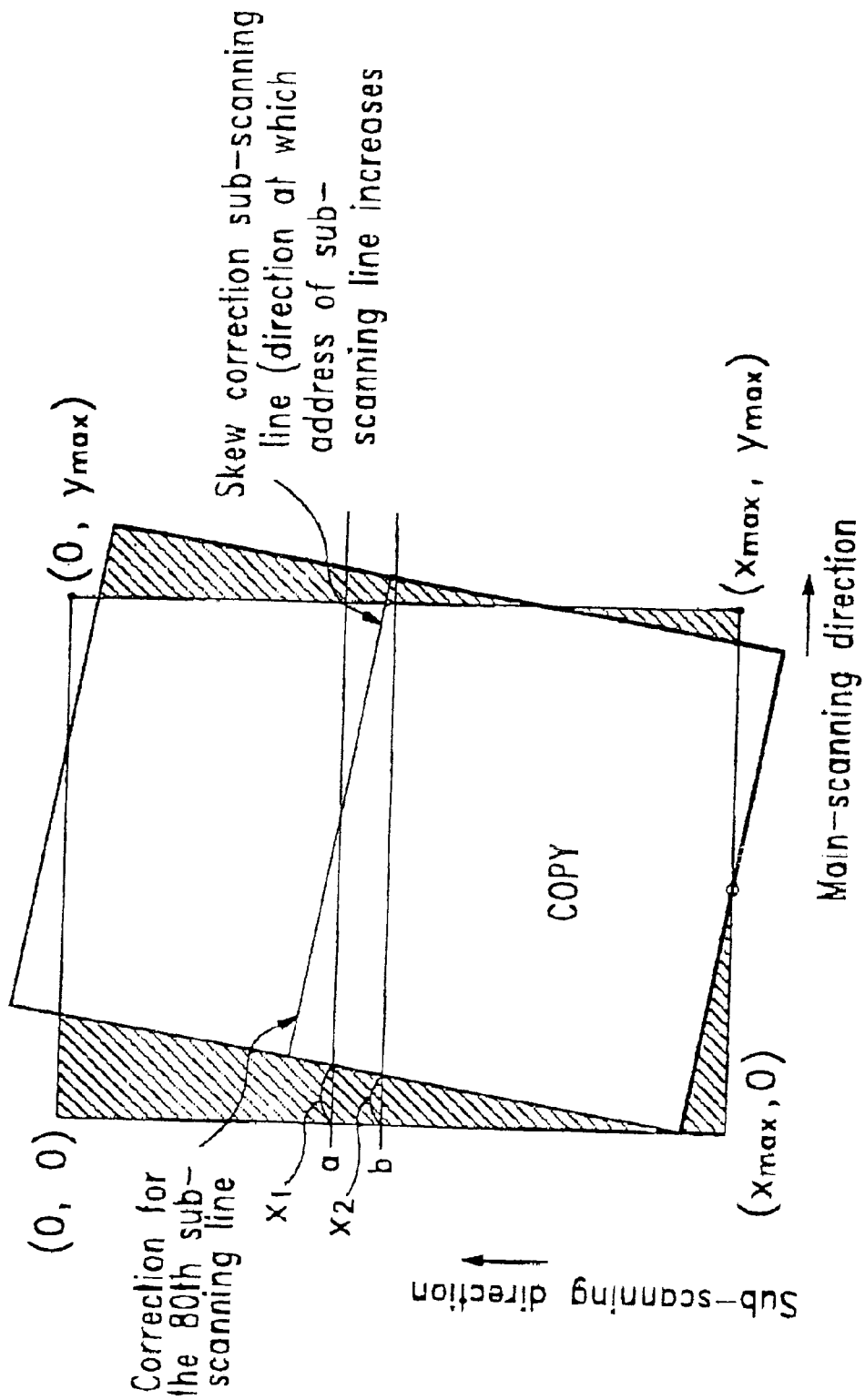
FIG. 12 illustrates a copy tilting to the right.

Utilizing such an aspect, the counter 820 counts the number of black pixels with respect to the data stored in the read data storing unit 810, starting from effective pixels of the two spots a and b separated from each other by a predetermined space (for example, 100 pixels) in the sub-scanning direction, as shown in FIGS. 10 and 12, until a first white pixel data is met (steps S142, S143).

Then, processing unit 830 senses the skew direction by calculating the difference between the black pixels of the two spots in the main-scanning direction (step S144).

That is, processing unit 830 senses the skew direction as "right" when the value obtained by subtracting the number of pixels at a second spot (b) in the sub-scanning direction from those at a first spot (a) in the sub-scanning direction is larger than "0". Processing unit 830 senses the skew direction as "left" when the value obtained by subtracting the number of pixels at the second spot (b) in the sub-scanning direction from those at the first spot (a) in the sub-scanning direction is smaller than "0".

After the skew direction is sensed, the skew correction data with respect to the difference of the number of pixels between two spots (i.e., lookup data) are read from the lookup table data storing unit 840 (step S145).

Then, the skew is corrected according to the read skew correction data, by reading the changed coordinates in the main-scanning direction by line units with respect to all sub-scanning lines of the data stored in the read data storing unit 810 (step S146).

The above-described skew correction method can be applied to the case where the copy tilts to the left and to the case where the copy tilts to the right. An example which will be explained hereinafter is for the 80th sub-scanning line correction.

Referring to FIG. 10 which illustrates a copy tilting to the left, the number of black pixels counted along the sub-scanning line (a) is x1 and the number of black pixels counted along the sub-scanning line (b) is x2. If the difference between the number of pixels of the two sub-scanning lines is 22, the pixel interval(n) is 4, and the number of repetition times (m) is 2, as shown in lookup table data (FIG. 9) stored in the lookup table data storing unit 840. When a correction regarding the sub-scanning line is performed according to such correction data, it should be controlled in such a manner that the displacement of the sub-scanning line is a decrease by one line if the pixels at the main-scanning line increase by four, and after such a process repeats twice, the displacement of the sub-scanning line is a decrease by one line if pixels at the main-scanning line increase by five.

In an embodiment described with reference to FIG. 10, it is assumed that the correction is performed with respect to 80th sub-scanning line. Each pixel of the copy is marked as coordinates (x, y), and the correction for the sub-scanning line is performed by reading the image data stored in the read data storing unit 810, as coordinates (x, y) shown in FIG. 11.

Similarly, if a copy tilts to the right and the difference between the number of black pixels of the two spots is 22, the correction regarding the 80th sub-scanning line is performed by reading the image data stored in the read data storing unit 810, as coordinates (x, y) shown in FIG. 13.

Figure 15A:
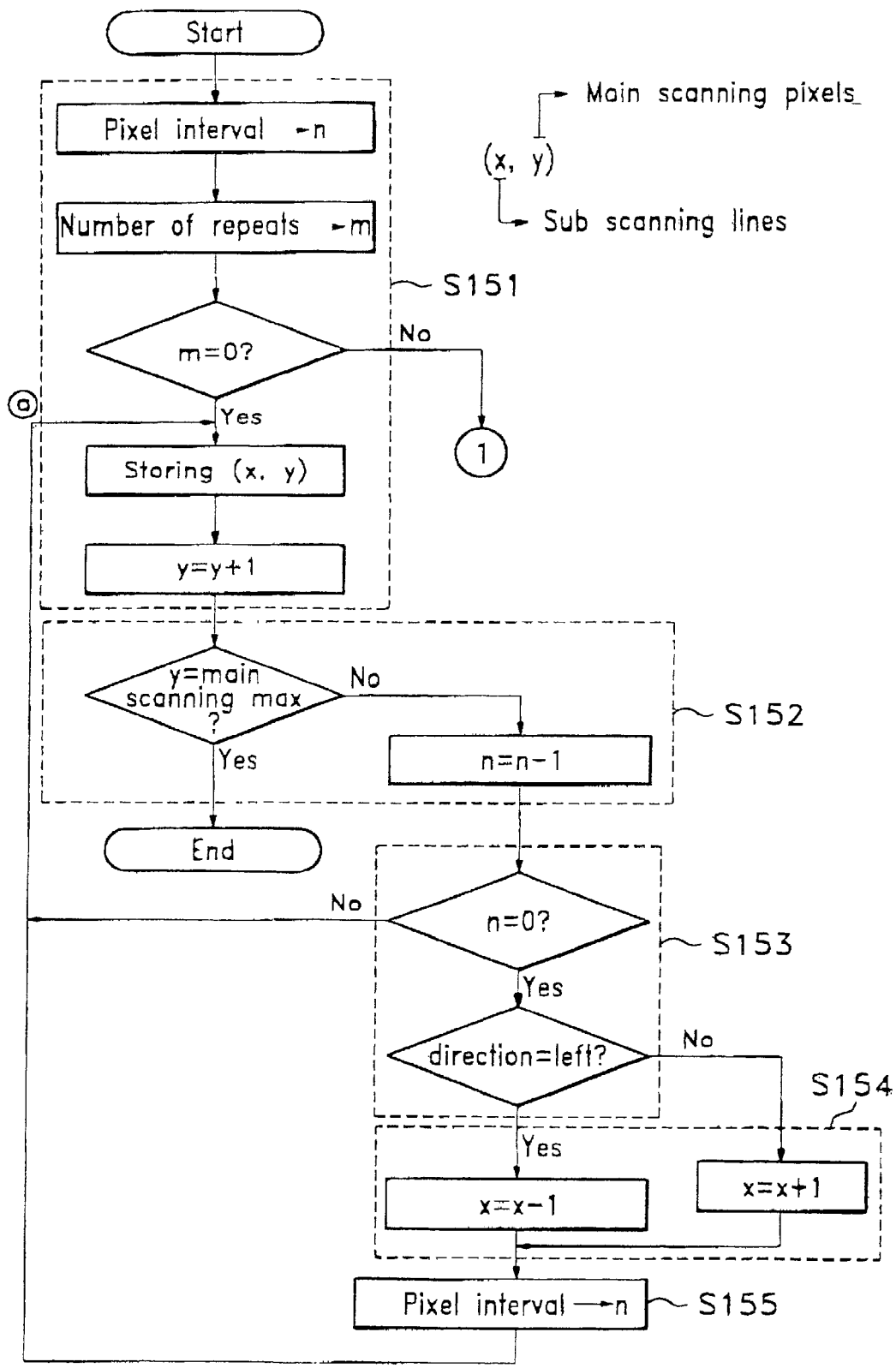
FIGS. 15A and 15B are flow diagrams showing the skew correction for one sub-scanning line among the skew correction methods of the present invention.
Figure 15B:
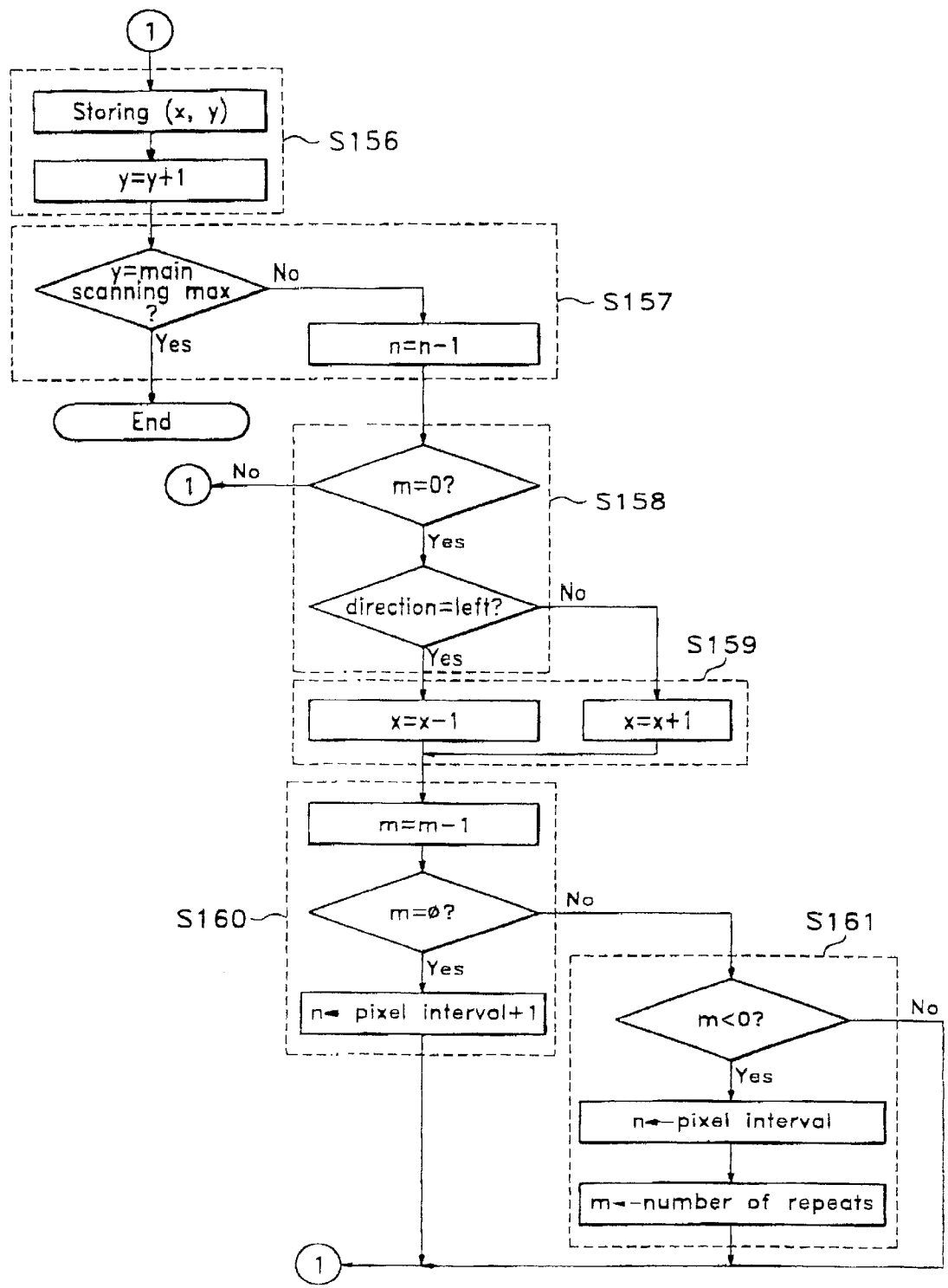

Procedures for such a skew correction can be explained with reference to FIGS. 15A and 15B.

If the lookup table data (i.e., number of repetition times (m)) is read as "0" in step S145, the pixel data stored in the current coordinates (x, y) is read from the read data storing unit 810 and is stored, and the address increases in the main-scanning direction (step S151).

If the main-scanning address is determined as maximum, the correction for the relevant sub-scanning line ends. Otherwise, the pixel interval (n) decreases by one (step S152).

Then, if the pixel interval(n) is determined as other than 0, the step goes back to step (a). Otherwise, the skew direction is determined (step S153).

If the direction is determined as left, the number of sub-scanning lines decreases by one, and if the direction is determined as right, the number of sub-scanning lines increases by one (step S154).

After adjusting the sub-scanning fine according to the skew (Erection, the pixel interval(n) is reset, and the process returns to step (a) (step S155). If the number of repetition times(m) is other than 0, the pixel data stored in the current coordinates (x, y) are read from the read data storing unit 810 and are stored, and the address increases in the main-scanning direction (step S156).

If the main-scanning address is determined as maximum, the correction for the relevant sub-scanning line ends. Otherwise, the pixel interval(n) decreases by one (step S157).

Then, if the pixel interval(n) is determined as other than 0, the step goes back to step (1). Otherwise, the skew direction is determined (step S158).

If the direction is determined as left, the number of sub-scanning lines decreases by one, and if the direction is determined as right, the number of sub-scanning lines increases by one (step S159).

Then, the number of repetition times (m) decreases by one, and the number of repetition times(m) is checked for a zero value. If the number of repetition times(m) is determined to be 0, the pixel interval(n) is set as pixel interval +1, and the process returns to step (1) (step S160).

If the number of repetition times(m) is other than 0, then a determination is made as to whether the number of repetition times (m) is smaller than 0. If the number of repetition times(m) is larger than 0, the process moves directly to step (1), and if the number of repetition times (m) is smaller than 0, the pixel interval(n) and the number of repetition times(m) are reset, and the process moves to step (1) (step S161).

As described above, the present invention has advantages in that cost can be curtailed by performing corrections on skew angle using a low cost processor through a simplified skew correction procedure without a complicated operation for calculating a skew angle or rotating an image on a copy in accordance with the calculated skew angle.

While an exemplary embodiment of the invention has been described in detail, those skilled in the art will recognize that there are many possible modifications and variations as fall within the spirit and scope of the appended claims.

What is claimed is:

1. A skew correction apparatus in an image processor for reading data on a one-page copy and performing image processing, said skew correction apparatus comprising:
    a read data storing unit for storing the data read from the one-page copy;
    a counter for counting a number of pixels in a main-scanning direction until copy discriminating data are met, starting from two spots of said data stored in said read data storing unit in a sub-scanning direction;
    a lookup table data storing unit for storing skew correction data corresponding to a difference between the number of pixels of said two spots counted in the main-scanning direction; and
    a processing unit for correcting skew by sensing a skew direction of said copy according to a selected rule using said difference between the number of pixels counted, and by reading by line units changed coordinates from said read data storing unit according to the skew correction data stored in said lookup table data storing unit.

2. A skew correction apparatus according to claim 1, wherein said copy discriminating data comprise first white pixel data of said two spots in the main-scanning direction.

3. A skew correction apparatus according to claim 1, wherein said lookup table data storing unit stores lookup table data which comprises:
    the difference between the number of pixels of said two spots in the main-scanning direction;
    a pixel interval for determining a number of pixels to be read in the main-scanning direction from said data stored in said read data storing unit according to said difference between number of pixels; and
    a number of repetition times for determining a number of times of reading, in the main-scanning direction at said pixel intervals, said data stored in said read data storing unit corresponding to coordinates changed between one sub-scanning line and any adjacent sub-scanning line.

4. A skew correction apparatus according to claim 1, wherein said image processor comprises a device provided with a facsimile function.

5. A skew correction apparatus according to claim 1, wherein said sensing of the skew direction comprises sensing said skew direction as "right" when a value obtained by subtracting a number of pixels at a second spot in the sub-scanning direction from a number of pixels at a first spot in the sub-scanning direction is larger than "0", and sensing said skew direction as "left" when a value obtained by subtracting a number of pixels at a second spot in the sub-scanning direction from a number of pixels at a first spot in the sub-scanning direction is smaller than "0".

6. A skew correction method for correcting a one-page copy which is read and stored in a skewed manner, said method comprising the steps of:

counting a number of pixels in a main-scanning direction until copy discriminating data are met, starting from two spots of said read data in a sub-scanning direction;

sensing a skew direction of said copy using said counted number of pixels;

reading skew correction data corresponding to a difference between said counted number of pixels of said two spots in the main-scanning direction; and correcting a skew according to a selected rule using said difference between said counted number of pixels by reading, in the main-scanning direction, the changed coordinates by line units with respect to all lines of said copy in the sub-scanning direction according to said skew correction data and said skew direction.

7. A skew correction method according to claim 5, wherein said skew correction data comprises:

a pixel interval for determining a number of pixels to be read in the main-scanning direction according to said difference between the number of pixels of said two spots in the main-scanning direction; and a number of repetition times for determining a number of times of reading, in the main-scanning direction at pixel intervals, data corresponding to coordinates changed between one sub-scanning line and a next sub-scanning line.

8. A skew correction method according to claim 7, wherein said step of correcting the skew comprises reading a pixel corresponding to coordinates where moved with respect to one sub-scanning line along said skew direction during repetition of said pixel interval if said number of repetition times is "0", and repeatedly reading said pixel interval according to said number of times of reading and reading a pixel corresponding to coordinates where moved with respect to one sub-scanning line along said skew direction if said number of repetition times is other than "0", and number of repetition times +1 reads the pixel corresponding to coordinates where moved with respect to one sub-scanning line along said skew direction during running of the pixel interval +1.

9. A skew correction method according to claim 8, wherein said corresponding coordinates correspond to a position where lines in the sub-scanning direction are decreased by one when said skew direction is left, and correspond to a position where lines in the sub-scanning direction are increased by one when said skew direction is right.

10. A skew correction apparatus in an image processor for reading data on a one-page copy and performing image processing, said skew correction apparatus comprising:

read data storing means for storing the data read from the one-page copy;

counter means for counting a number of pixels in a main-scanning direction until copy discriminating data are met, starting from two spots of said data stored in said read data storing means in a sub-scanning direction;

lookup table data storing means for storing lookup table data including skew correction data corresponding to a difference between the number of pixels of said two spots counted in the main-scanning direction; and processing means for correcting skew by sensing a skew direction of said copy by using said difference between the number of pixels counted and by reading changed coordinates from said read data storing means according to the skew correction data stored in said lookup table data storing means.

11. A skew correction apparatus according to claim 10, wherein said copy discriminating data comprises first white pixel data of said two spots in the main-scanning direction.

12. A skew correction apparatus according to claim 10, wherein said lookup table data comprises:

the difference between the number of pixels of said two spots in the main-scanning direction;

a pixel interval for determining a number of pixels to be read in the main-scanning direction from said data stored in said read data storing means according to said difference between the number of pixels; and a number of repetition times for repeatedly reading, in the main-scanning direction at said pixel intervals, said data stored in said read data storing means corresponding to coordinates changed between one sub-scanning line and an adjacent sub-scanning line.

13. A skew correction apparatus according to claim 10, wherein said image processor comprises a device provided with a facsimile function.

14. A skew correction apparatus according to claim 10, wherein said sensing of the skew direction comprises sensing said skew direction as "right" when a value obtained by subtracting a number of pixels at a second spot in the sub-scanning direction from a number of pixels at a first spot in the sub-scanning direction is larger than "0", and sensing said skew direction as "left" when a value obtained by subtracting a number of pixels at a second spot in the sub-scanning direction from a number of pixels at a first spot in the sub-scanning direction is smaller than "0".

15. A skew correction method for correcting a one-page copy which is read and stored in a skewed manner, said method comprising the steps of:

counting a number of pixels in a main-scanning direction until copy discriminating data are met, starting from two spots of said read data in a sub-scanning direction;

sensing a skew direction of said copy using said counted number of pixels;

reading skew correction data corresponding to a difference between the counted number of pixels of said two spots in the main-scanning direction; and correcting a skew by reading, in the main-scanning direction, the changed coordinates by line units with respect to all lines of said copy in the sub-scanning direction according to said skew correction data and said skew direction;

wherein said step of sensing the skew direction comprises sensing said skew direction as "right" when a value obtained by subtracting a number of pixels at a second spot in the sub-scanning direction from a number of pixels at a first spot in the sub-scanning direction is larger than "0", and sensing said skew direction as "left" when a value obtained by subtracting a number of pixels at a second spot in the sub-scanning direction from a number of pixels at a first spot in the sub-scanning direction is smaller than "0".

16. A skew correction method according to claim 15, wherein said skew correction data comprises:

a pixel interval for determining a number of pixels to be read in the main-scanning direction according to said difference between the number of pixels of said two spots in the main-scanning direction; and a number of repetition times for determining a number of times of reading, in the main-scanning direction at pixel intervals, data corresponding to coordinates changed between one sub-scanning line and a next sub-scanning line.

17. A skew correction method according to claim 16, wherein said step of correcting the skew comprises reading a pixel corresponding to coordinates where moved with respect to one sub-scanning line along said skew direction during repetition of said pixel interval if said number of repetition times is "0", and repeatedly reading said pixel interval according to said number of times of reading and reading a pixel corresponding to coordinates where moved with respect to one sub-scanning line along said skew direction if said number of repetition times is other than "0", and number of repetition times +1 reads the pixel corresponding to coordinates where moved with respect to one sub-scanning line along said skew direction during running of the pixel interval +1.

18. A skew correction method according to claim 17, wherein said corresponding coordinates correspond to a position where lines in the sub-scanning direction are decreased by one when said skew direction is left, and correspond to a position where lines in the sub-scanning direction are increased by one when said skew direction is right.

19. A skew correction method according to claim 15, wherein said step of correcting the skew comprises reading a pixel corresponding to coordinates where moved with respect to one sub-scanning line along said skew direction during repetition of a pixel interval if a number of repetition times is "0", and repeatedly reading said pixel interval according to a number of times of reading and reading a pixel corresponding to coordinates where moved with respect to one sub-scanning line along said skew direction if said number of repetition times is other than "0", and said number of repetition times +1 reads the pixel corresponding to coordinates where the number of pixels moved with respect to one sub-scanning line along said skew direction during running of the pixel interval +1.

20. A skew correction method for correcting a one-page copy which is read and stored in a skewed manner, said method comprising the steps of:

counting a number of pixels in a main-scanning direction until copy discriminating data are met, starting from two spots of said read data in a sub-scanning direction;

sensing a skew direction of said copy using said counted number of pixels;

reading skew correction data corresponding to a difference between the counted number of pixels of said two spots in the main-scanning direction; and correcting a skew by reading, in the main-scanning direction, the changed coordinates by line units with respect to all lines of said copy in the sub-scanning direction according to said skew correction data and said skew direction;

wherein said step of correcting the skew comprises reading a pixel corresponding to coordinates where moved with respect to one sub-scanning line along said skew direction during repetition of a pixel interval if a number of repetition times is "0", and repeatedly reading said pixel interval according to a number of times of reading and reading a pixel corresponding to coordinates where moved with respect to one sub-scanning line along said skew direction if said number of repetition times is other than "0", and said number of repetition times +1 reads the pixel corresponding to coordinates where the number of pixels moved with respect to one sub-scanning line along said skew direction during running of the pixel interval +1.

* * * * *